United States Patent [19]
Ogasawara et al.

[11] 4,388,909
[45] Jun. 21, 1983

[54] FUEL INJECTION TIMING CONTROL SYSTEM FOR A DIESEL ENGINE

[75] Inventors: Hiroshi Ogasawara; Miyao Takai, both of Yokohama, Japan

[73] Assignee: Nissan Motor Company, Limited, Yokohama, Japan

[21] Appl. No.: 315,507

[22] Filed: Oct. 27, 1981

[30] Foreign Application Priority Data

Oct. 28, 1980 [JP] Japan ............................ 55-154020[U]

[51] Int. Cl.³ ...................... F02M 37/08; F02B 47/08
[52] U.S. Cl. .................................... 123/501; 123/569; 123/571
[58] Field of Search ............... 123/501, 502, 489, 569, 123/571

[56] References Cited
U.S. PATENT DOCUMENTS

| | | | |
|---|---|---|---|
| 4,217,871 | 8/1980 | Ohashi et al. | 123/501 |
| 4,248,196 | 2/1981 | Toelle | 123/489 |
| 4,333,440 | 6/1982 | Eheim | 123/569 |

OTHER PUBLICATIONS

Straubel, M., "Distributor Injection Pump, Type VE, Design and Examples for Application", *A.S.M.E.*, Pub. 78-DGP-7, Aug. 1979, pp. 1-11.

*Primary Examiner*—William A. Cuchlinski, Jr.
*Attorney, Agent, or Firm*—Schwartz, Jeffery, Schwaab, Mack, Blumenthal & Koch

[57] ABSTRACT

A fuel injection timing control system for a Diesel engine, having a fuel injection pump supplying fuel to the engine periodically according to the rotation of the engine crankshaft, and a device connected to the fuel injection pump to vary the fuel injection timing in terms of crank angle. The engine is equipped with an exhaust gas recirculation arrangement. A control unit is connected to the device and the arrangement to drive them in such a manner that when the arrangement is operative to effect the exhaust gas recirculation, the fuel injection timing is advanced compared to that under the condition where the exhaust gas recirculation arrangement is at rest suspending the exhaust gas recirculation.

8 Claims, 9 Drawing Figures

CHARACTERISTICS OF EGR CONTROL

FUEL INJECTION TIMING CONTROL SYSTEM FOR A DIESEL ENGINE

BACKGROUND OF THE INVENTION

1. Field of the Invention

This invention relates to a fuel injection timing control system for a Diesel engine, which incorporates an exhaust gas recirculation (EGR) arrangement and which adjusts the fuel injection timing according to the condition of EGR.

2. Description of the Prior Art

It is generally understood that the presence of noxious oxides of nitrogen (NOx) in the exhaust of internal combustion engines is determined by combustion temperature and pressure. An increase in combustion temperature causes an increase in the amount of NOx present in the engine exhaust. It is, therefore, desirable to control the combustion temperature in order to limit the amount of NOx present in the exhaust of an internal combustion engine.

One method suggested by prior art for limiting or controlling the combustion temperature has been to recirculate a portion of the exhaust gas back into the engine air intake. Since the exhaust gas is low in oxygen, this will result in a diluted combustion mixture which will burn at a lower temperature. The lower combustion temperature will, in turn, reduce the amounts of NOx produced during combustion.

A diesel engine is conventionally equipped with a fuel injection pump which distributes and delivers the fuel to the combustion chambers through injection nozzles. This pump also controls the timing of fuel injected into the combustion chambers according to the engine speed (RPM) or the engine load whereby the engine always operates under the optimum conditions. Moreover, it should be understood that not only the fuel injection timing, but also the amount of exhaust gas recirculated through the engine, affects the working conditions of the engine considerably.

SUMMARY OF THE INVENTION

It is an object of the present invention to provide a fuel injection timing control system for a Diesel engine, which incorporates an exhaust gas recirculation (EGR) arrangement and which adjusts the fuel injection timing according to the condition of EGR to optimize both the fuel injection timing and the condition of EGR in order to always operate the engine under effective and stabilized conditions while reducing the amount of NOx present in the engine exhaust to an acceptable level.

The fuel injection timing control system of the present invention, when used with a Diesel engine, has a fuel injection pump supplying fuel to the engine periodically according to the rotation of the engine crankshaft, and a device connected to the fuel injection pump to vary the fuel injection timing in terms of crank angle. The engine is equipped with an EGR arrangement. A control unit is connected to the device and the EGR arrangement to drive them in such a manner that when the EGR arrangement is operative to effect EGR, the fuel injection timing is advanced compared to the timing when the EGR arrangement is at rest suspending the EGR.

The above and other objects, features and advantages of the present invention will be apparent from the following description of preferred embodiments thereof, taken in conjunction with the drawings.

DESCRIPTION OF THE PREFERRED EMBODIMENTS

Figure 1:
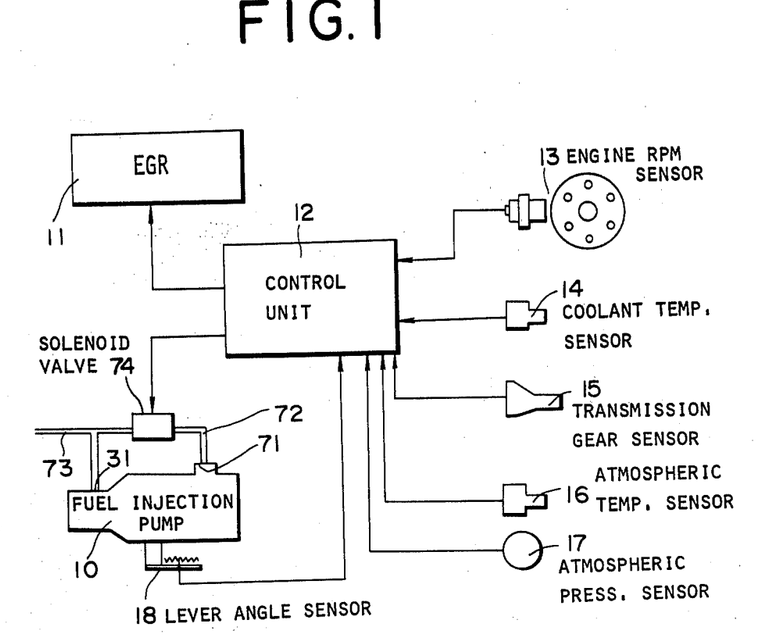
FIG. 1 is a diagrammatic view of a fuel injection timing control system according to an embodiment of the present invention.

With reference to FIG. 1, there is shown a fuel injection timing control system according to an embodiment of the present invention, which incorporates a fuel injection pump 10 and an EGR arrangement 11. This fuel injection timing control system is adapted for an automotive Diesel engine. A control unit 12 is electrically connected to the EGR arrangement 11 for driving the same so as to control the amount of exhaust gas recirculated through the engine. Sensors 13, 14, 15, 16, 17, and 18 are provided to detect the engine operating conditions electrically, namely the engine speed (RPM), the engine coolant temperature, the gear position or which gear is engaged in the transmission, the atmospheric temperature, the atmospheric pressure, and the lever angle of the fuel injection pump 10 corresponding to the power required from the engine or the engine load. These sensors are connected electrically to the control unit 12 to send the indications of the engine operating conditions thereto. The control unit 12 adjusts the amount of exhaust gas recirculated through the engine according to the engine operating conditions.

Figure 2:
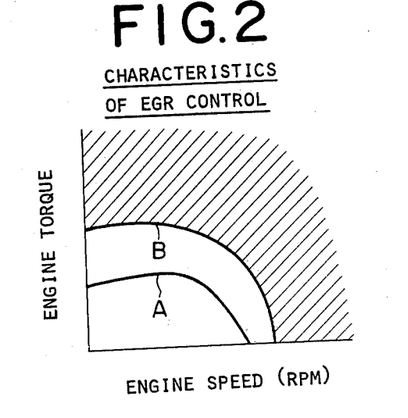
FIG. 2 is a graph of the characteristics of EGR control by the EGR arrangement of FIG. 1, wherein the engine torque corresponding to the engine load is along the ordinate and the the engine speed (RPM) is along the abscissa.

An example of the characteristics of EGR control is shown in FIG. 2, where the engine torque corresponding to the engine load is along the ordinate and the engine speed (RPM) is along the abscissa. In this case, the characteristics of EGR control have three stages. The first stage corresponds to the region inside the curve A of FIG. 2, where the rate of exhaust gas being recirculated is high. The second stage corresponds to the region between the curves A and B of FIG. 2, where the rate of exhaust gas being recirculated is low. The third stage corresponds to the region outside the curve B, where the rate of exhaust gas being recirculated is zero, in other words EGR is suspended. The un-hatched region in FIG. 2 corresponding to the first and second stages in accordance with a hereinafter described region where the fuel injection timing is relatively advanced. In practice, the control unit 12 drives the EGR arrangement 11 in response to the engine operating conditions, particularly the engine speed (RPM) and the engine load indicating the engine torque, so as to obtain the above characteristics of EGR control. By way of exception, when the engine coolant temperature is lower than a preset value, the control unit 12 forces the EGR arrangement 11 to suspend EGR irrespective of the other engine operating conditions to ensure the stability of the engine.

Figure 3:
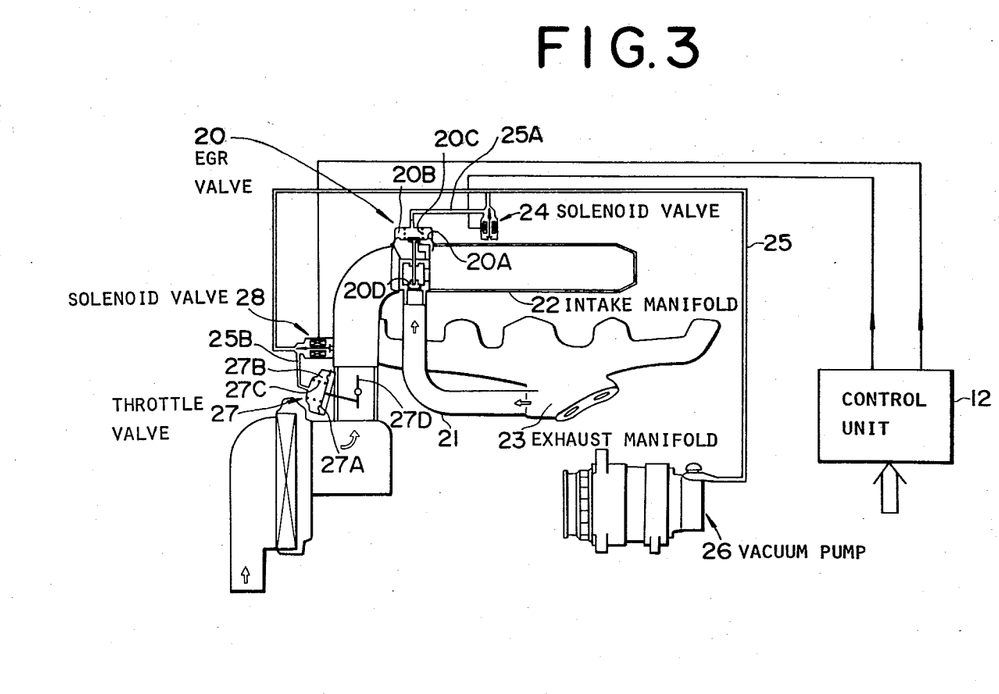
FIG. 3 is a diagrammatic sectional view of the EGR arrangement of FIG. 1.

As shown in FIG. 3, the EGR arrangement 11 includes a vacuum responsive EGR valve 20 disposed in an EGR conduit 21 connected at one end to an intake manifold or intake passage 22 and at the other end to an exhaust manifold 23. When the EGR valve 20 opens the EGR conduit 21, a part of the exhaust gas flows through the EGR conduit to be recirculated through the engine. The EGR valve has a diaphragm 20A defining a working chamber 20B, a return spring 20C urging the diaphragm 20A, and a valve member 20D connected to the diaphragm 20A in such a manner as to be movably located in the EGR conduit 21 (see FIG. 8). The lower surface of the diaphragm 20A opposite to the working chamber 20B is subjected to atmospheric pressure. An electrically-driven three-way solenoid valve 24 is provided to operate the EGR valve 20. The first inlet of the three-way valve 24 is connected by means of a conduit 25 to a vacuum pump 26 used as a vacuum source, and the second inlet thereof opens to the atmosphere. The outlet of the three-way valve 24 is connected by means of a conduit 25A to the working chamber 20B of the EGR valve 20. When energized, the three-way valve 24 lets its first inlet communicate with its outlet to introduce the vacuum developed by the vacuum pump 26 into the working chamber 20B, thereby displacing the diaphragm 20A along with the valve member 20D upward against the spring 20C to open the EGR conduit 21 to effect EGR. When de-energized, the three-way valve 24 blocks the communication between its first inlet and outlet and simultaneously lets its second inlet communicate with its outlet to introduce atmospheric pressure into the working chamber 20B, thereby displacing the diaphragm 20A along with the valve member 20D downward to close the EGR conduit 21 to suspend EGR.

Additionally, the EGR arrangement 11 includes a vacuum responsive throttle valve 27 disposed in the intake passage 22 upstream of the inlet of the EGR conduit 21 to develop sufficient vacuum in the intake passage 22 downstream thereof to facilitate EGR. Thus, when the EGR valve 20 is open and the throttle valve 27 is closed, the rate of exhaust gas being recirculated is relatively high to give the aforementioned first stage of EGR control. When the EGR valve 20 and the throttle valve 27 are both open, the rate of exhaust gas being recirculated is relatively low to give the aforementioned second stage of EGR control. On the other hand, when the EGR valve 20 is closed and the throttle valve 27 is open, no exhaust gas is recirculated to give the aforementioned third stage of EGR control. Even when closed, the throttle valve 27 passes therethrough air to facilitate the combustion of fuel in the engine cylinders (not shown).

The throttle valve 27 has a diaphragm 27A defining a working chamber 27B, a return spring 27C urging the diaphragm 27A, and a valve member 27D connected to the diaphragm 27A in such a manner as to be movably located in the intake passage 22. The surface of the diaphragm 27A opposite to the working chamber 27B is subjected to atmospheric pressure. A three-way valve 28 similar to the three-way valve 24 is provided to operate the throttle valve 27. The first inlet of the three-way valve 28 is connected by means of the conduit 25 to the vacuum pump 26, and the second inlet thereof opens to the atmosphere. The outlet of the three-way valve 28 is connected by means of a conduit 25B to the working chamber 27B of the throttle valve 27. When energized, the three-way valve 28 lets its first inlet communicate with its outlet to introduce a vacuum into the working chamber 27B, thereby displacing the diaphragm 27A toward the working chamber 27B against the spring 27C to turn the valve member 27D in the direction of closing the throttle valve 27. When de-energized, the three-way valve 28 blocks the communication between its first inlet and outlet and simultaneously lets its second inlet communicate with its outlet to introduce atmospheric pressure into the working chamber 27B, thereby displacing the diaphragm 27A away from the working chamber 27B to turn the valve member 27D in the direction of opening the throttle valve 27. In practice, the control unit 12 is electrically connected to the three-way valves 24 and 28 to drive them in response to the engine operating conditions to obtain the aforementioned characteristics of EGR control.

It should be noted that the characteristics of EGR control is not limited to the three stages. For example, the EGR control can be designed to have more stages, by making the degree of opening of the EGR valve 20 or the throttle valve 27 have several closer intervals in response to the engine operating conditions. The EGR control can be also designed to operate in a continuous manner, by changing the degree of opening of the valve 20 or 27 continuously in response to the engine operating conditions.

The control unit 12 also adjusts the fuel injection timing in accordance with the operation of the EGR arrangement 11 or the condition of EGR. When the EGR arrangement 11 is operative to effect EGR, the fuel injection timing is advanced compared to that under the condition when the EGR arrangement 11 is at rest suspending EGR, in order to improve the efficiency of the engine operation and reduce the amount of hydro-carbons (HC) or smoke present in the exhaust gas while suppressing the amount of NOx present in the exhaust gas to an acceptably low level.

Figure 4:
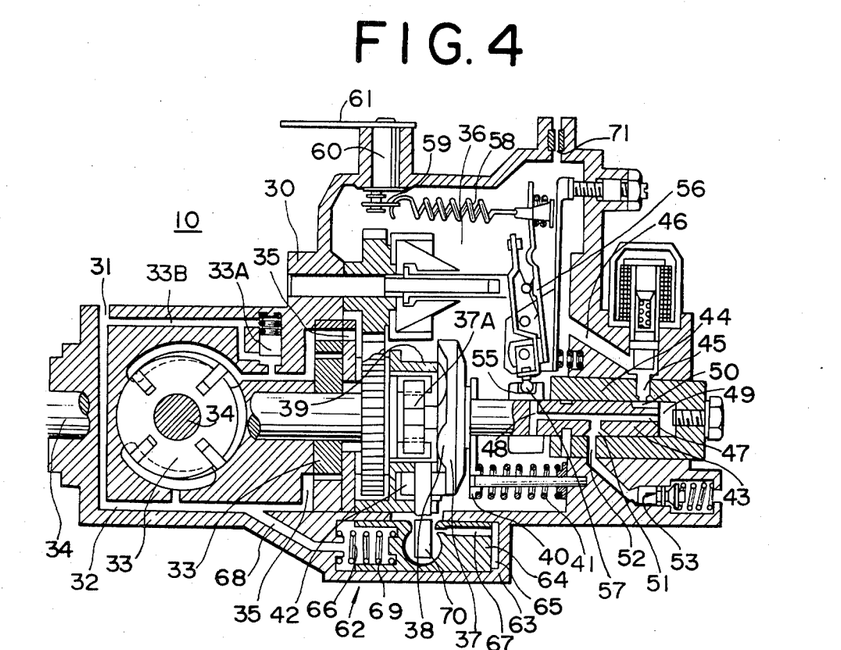
FIG. 4 is a diagrammatic sectional view of the fuel injection pump of FIG. 1.
Figure 5:
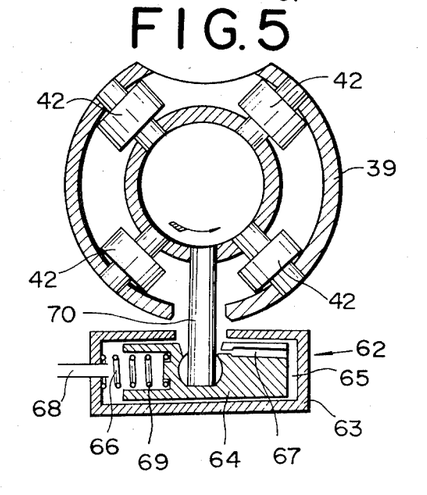
FIG. 5 is a sectional view of a timer assembly and a roller casing with rollers contained in the fuel injection pump of FIG. 1.

With reference to FIGS. 4 and 5, the fuel injection pump 10 includes a housing 30 with a fuel inlet 31 and a fuel passage 32 communicating therewith. A rotary feed pump 33 is enclosed within the housing 30 and is driven by the engine to rotate at half the speed of and a constant phase relationship with the engine crankshaft (not shown) through a drive shaft 34 coupled to the engine crankshaft, in order to supply fuel admitted from the inlet 31 through the passage 32 and another passage 35 to a chamber 36 formed inside the housing 30. A pressure regulating valve 33A may return a portion of fuel, discharged from the pump 33, into the passage 32 through a return passage 33B to regulate the pressure of fuel. For convenience sake, the pump 33 is shown rotated through 90° about an axis perpendicular to the drive shaft 34, in addition to the normal picture thereof. A cam disc 37 is attached by keys 37A to the drive shaft in such a manner that it can easily move axially along the drive shaft but it can also rotate together with the drive shaft. The cam disc 37 has a plurality of cam faces 38 whose number corresponds to the number of engine cylinders. The cam disc 37 is urged by a biasing plate 40 and plunger spring 41 toward a cylindrical roller casing 39 to be always engaged to rollers 42 on the casing 39. In this case, the roller casing 39 rotatably supports the rollers 42 spaced at 90° intervals corresponding to the cam faces 38. Since the roller casing 39 is supported so as not to rotate along with the drive shaft, the cam disc 37 reciprocates axially by a predetermined amount of cam lift when each cam face 38 passes over the roller 42 as the cam disc is rotated by the drive shaft 34 in synchronism with twice the rotation of the engine crankshaft.

A fuel supply plunger 43 is secured to the cam disc 37 so as to rotate with the drive shaft 20 and is fitted slidably into a cylinder 44 secured to the housing 30. The plunger 43 also moves axially with the axial motion of the cam disc 37. The cylinder 44 is provided with an intake port 45 which communicates with the chamber 36 through a fuel supply passage 46. The plunger 43 is provided with a central axial passage 47 and a transverse spill port 48 communicating therewith to release the pressure from a high pressure chamber 49 formed by the end of the plunger 43 and the cylinder 44. A control sleeve 55 is slidably mounted on the plunger 43, controlling the opening of the spill port 48 to the chamber 36. As the control sleeve 55 moves away from the disc 37, the opening timing of the spill port 48 is retarded. The plunger 43 has therein intake grooves 50 through which the intake port 45 and the high pressure chamber 49 communicate selectively according to the phase of the plunger 43, and a distributor port 51 communicating with the central passage 47 and opening from the side of the plunger. The distributor port 51 selectively communicates with any one of radial outlet passages 52 formed in the cylinder 44 and the housing 30 so as to be distributed around the plunger 43. The outlet passages 52 lead to the corresponding engine cylinders (not shown) through corresponding delivery valves 53 and injection nozzles (not shown).

When the plunger 43 moves away from the high pressure chamber 49 while rotating, the intake groove 50 comes into communication with the intake port 45 to admit fuel into the high pressure chamber 49 from the chamber 36 through the fuel supply passage 46, thereby effecting a fuel intake stroke. When the plunger 43 moves toward the high pressure chamber 49, the communication between the intake groove 50 and the intake port 45 is blocked and the fuel in the high pressure chamber 49 is pressurized to enter the corresponding engine cylinder synchronously with twice the rotation of the engine crankshaft through the central axial passage 47, the distributor port 51, the outlet passage 52, the delivery valve 53, and the injection nozzle. Then, as soon as the spill port 48 is uncovered by the control sleeve 55, the fuel in the high pressure chamber 49 returns to the chamber 36 through the central axial passage 47 and the spill port 51, so that the fuel injection is ended. Thus, the fuel injection pump 10 supplies fuel to each of the engine cylinders in turn once every two rotations of the engine crankshaft at a constant phase relationship.

A lever 56 is connected at its base to the control sleeve 55 by means of a ball joint 57. A helical member 58 is engaged at one end to the free end of the lever 56 and at its other end to an arm 59, which is secured eccentrically to a shaft 60 disposed rotatably in the housing 30. A control lever 61 is fixed to the end of the shaft 60 outside the housing 30. When the control lever 61 is pivoted in one direction, the control sleeve 55 is moved away from the disc 37 to retard the opening timing of the spill port 48 and thus increase the period during which the fuel is injected (in terms of crank angle) to increase the amount of fuel injected into the engine cylinders. The control lever 61 is driven by an accelerator pedal (not shown) to control the amount of fuel injected in response to the depression of the accelerator pedal corresponding to the power required from the engine. The angle of the control lever 61 is detected by the sensor 18 (see FIG. 1) including a voltage applied potentiometer driven by the control lever 61, so that its output voltage will vary with the angle of the control lever 61.

The roller casing 39 is supported so as to be able to rotate circumferentially. As the roller casing 39 with the rollers 42 is rotated in the direction opposite to the rotation of the cam disc 37, the timing at which the cam faces 38 pass the rollers 42 is relatively advanced. Therefore, such rotation of the roller casing 39 advances the fuel injection timing in terms of crank angle, since the fuel is injected when each cam face 38 passes over a roller 42. A timer assembly 62 is provided to vary the fuel injection timing according to the engine speed (RPM) by rotating the roller casing 39. The timer assembly 62 includes a timer cylinder 63 and a timer piston 64 disposed slidably within the cylinder 63 so as to define high-pressure and low-pressure chambers 65 and 66 in the cylinder 63 at the opposite ends of the piston. The high-pressure chamber 65 communicates with the chamber 36 through a passage 67 in the piston 64 to introduce thereinto the pressure of fuel fed from the feed pump 33 to the chamber 36. The low-pressure chamber 66 communicates through a passage 68 with the fuel passage 32 leading to the inlet of the feed pump 33 to introduce thereinto the pressure of fuel fed to the feed pump 33. A timer spring 69 is arranged in the low-pressure chamber 66 to bias the piston 64 toward the high-pressure chamber 65. Thus the piston 64 moves axially according to the pressure difference between the chambers 65 and 66. The roller casing 39 is connected to the piston 64 by means of a driving pin 70 which is rotated according to the axial movement of the piston 64. An increase in the rotational speed of the feed pump 33 or the engine speed (RPM) causes an increase in the pressure of fuel in the chamber 36. Thus, when the engine speed (RPM) increases, the piston 64 is forced away from the high-pressure chamber 65, thereby rotating the roller casing 39 in the direction opposite to that of the cam disc 37 rotation to advance relatively the fuel injection timing in terms of crank angle. For convenience sake, the timer assembly 62 is shown with its longitudinal axis rotated through 90° in FIG. 4.

An overflow outlet 71 open to the chamber 36 is provided in the housing 30 to prevent an excessive pressure increase by releasing the fuel in the chamber 36 to the low pressure side. As shown in FIG. 1, an overflow conduit 72 connects the overflow outlet 71 to an fuel suction conduit 73 leading to the fuel inlet 31, in order to return the overflow fuel to the fuel inlet 31 or the low-pressure side of fuel. An ON-OFF electrically-driven solenoid valve 74 is disposed in the overflow conduit 72 to open or close the same. The solenoid valve 74 is electrically connected to the control unit 12 to be driven by the same. When the EGR arrangement 11 is operative to establish EGR, the control unit 12 closes the solenoid valve 74 to suspend the return of fuel through the overflow conduit 72, thereby raising the fuel pressure in the chamber 36. Thus, the pressure in the high-pressure chamber 65 in the timer assembly 62 is relatively increased, so that the timer piston 64 is forced away from the high-pressure chamber 65, thereby relatively advancing the fuel injection timing in terms of crank angle. This advance of the fuel injection timing restrains the impairment of fuel combustion due to EGR and reduces the amount of HC or smoke in the exhaust and thus the rate of fuel consumption while maintaining the amount of NOx in the exhaust at an acceptably low level. When the EGR arrangement 11 is at rest suspending EGR, the control unit 12 opens the solenoid valve 74 to allow the return of fuel through the overflow conduit 72 to regain the normal operation of the fuel injection pump, thereby controlling the fuel injection timing which is normally dependent on the engine speed (RPM).

Figure 6:
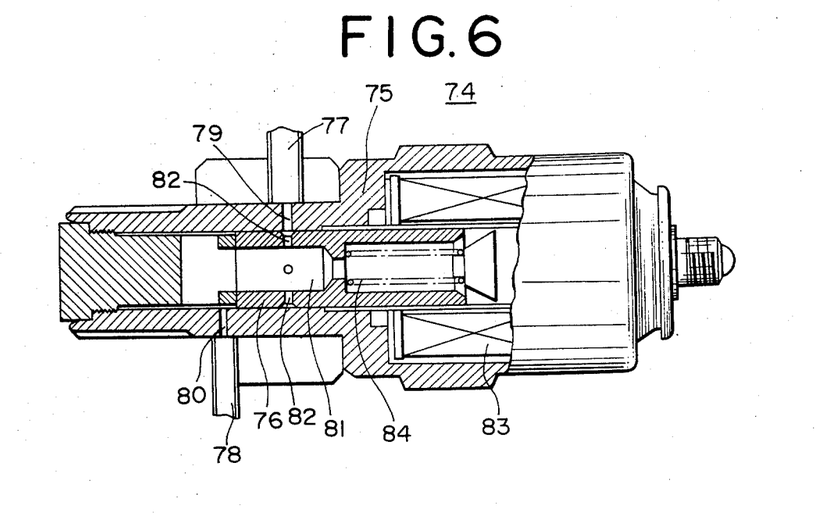
FIG. 6 is a sectional view of the solenoid valve of FIG. 1.

As shown in FIG. 6, the solenoid valve 74 has a cylindrical casing 75, a piston 76 disposed slidably in the casing 75, and an inlet 77 and outlet 78 attached to the casing 75. The casing 75 is provided with radial inlet and outlet ports 79 and 80 communicating with the inlet 77 and outlet 78, respectively. The piston 76 is provided with an axial central bore 81 and radial passages 82 opening into the bore 81. The solenoid valve 74 also has a coil 83 and a return spring 84 arranged in the casing 75 to bias the piston 76. The piston 76 is made of a magnetic material and is moved axially according to the energization of the coil 83 by the control unit 12. When the control unit 12 de-energizes the coil 83, the piston 76 is in a position where the inlet 77 and outlet 78 communicate with each other through the inlet port 79, the radial passages 82, the bore 81, and the outlet port 80. When the control unit 12 energizes the coil 83, the piston 76 is forced against the spring 84 to block the communication between the inlet port 79 and the radial passages 82, and thus that between the inlet 77 and outlet 78. The inlet 77 leads to the overflow outlet 71 of the fuel injection pump via the overflow conduit 72, while the outlet 78 leads to the fuel suction conduit 73 via the overflow conduit 72. Thus, when the solenoid valve 74 is energized, the overflow conduit 72 is switched from the open to the closed state.

Figure 7:
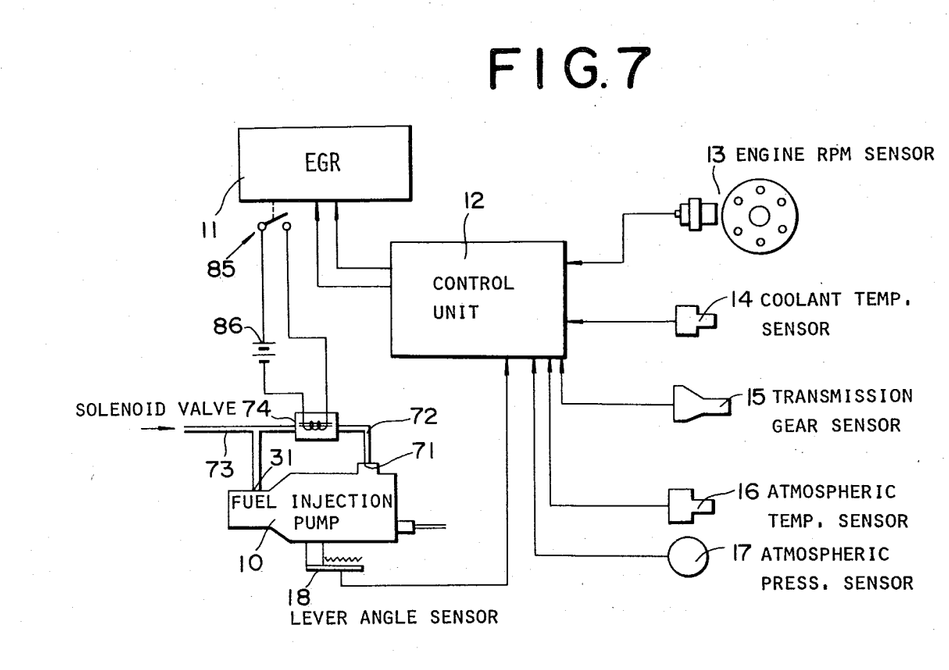
FIG. 7 is a diagrammatic view of a fuel injection timing control system according to another embodiment of the present invention.

Another embodiment of the present invention is shown in FIG. 7, wherein similar or corresponding elements to those of the preceding embodiment are designated by the same numerals in order to omit descriptions thereof. This embodiment features a sensor 85 detecting whether the EGR arrangement 11 is operative or at rest. The sensor 85 consists of a switch responsive to the movable part of the EGR valve so that the switch will be turned on to supply electrical energy from an electric power source 86 to the solenoid valve 74 when the EGR valve is switched from the closed to the open state to effect EGR. Thus, when the EGR arrangement 11 is operative, the solenoid valve 74 is closed to relatively advance the fuel injection timing in a similar way to that of the preceding embodiment. In practice, the solenoid valve 74, the power source 86, and the sensor 85 are connected so as to form a series circuit.

Figure 8:
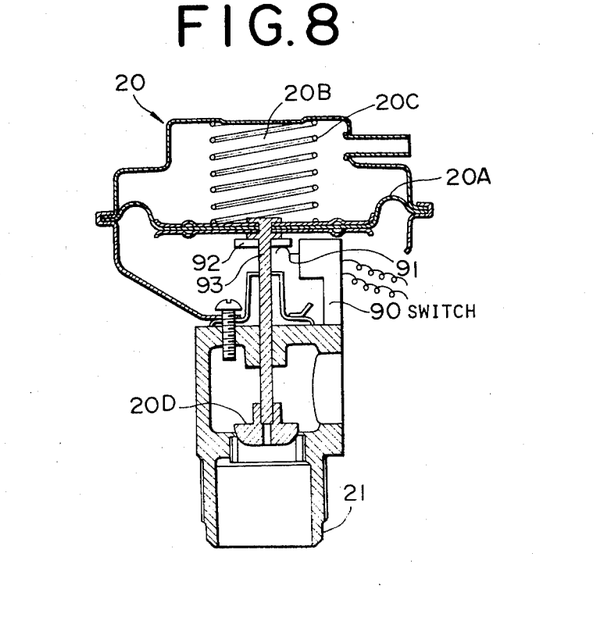
FIG. 8 is a diagrammatic sectional view of the EGR valve and the switch detecting the operation of the EGR valve of FIG. 7.

As shown in FIG. 8, the switch 90 constituting the sensor 85 is the securely-mounted limit type whose control arm 91 is driven by a ring 92 mounted on a rod 93 connecting the diaphragm 20A and the valve member 20D of the EGR valve 20. When the diaphragm 20A moves upward to open the EGR valve 20, the ring 92 moves upward with the diaphragm 20A and the rod 93 and becomes disconnected from the control arm 91, and then the control arm 91 moves by itself to turn the switch 90 from off to on. When the diaphragm 20A moves downward to close the EGR valve 20, the ring 92 also moves downward, forcing the control arm 91 downward to turn the switch 90 from on to off. Thus the switch 90 substantially responds to the motion of the valve member 20D determining the operation or condition of EGR.

Figure 9:
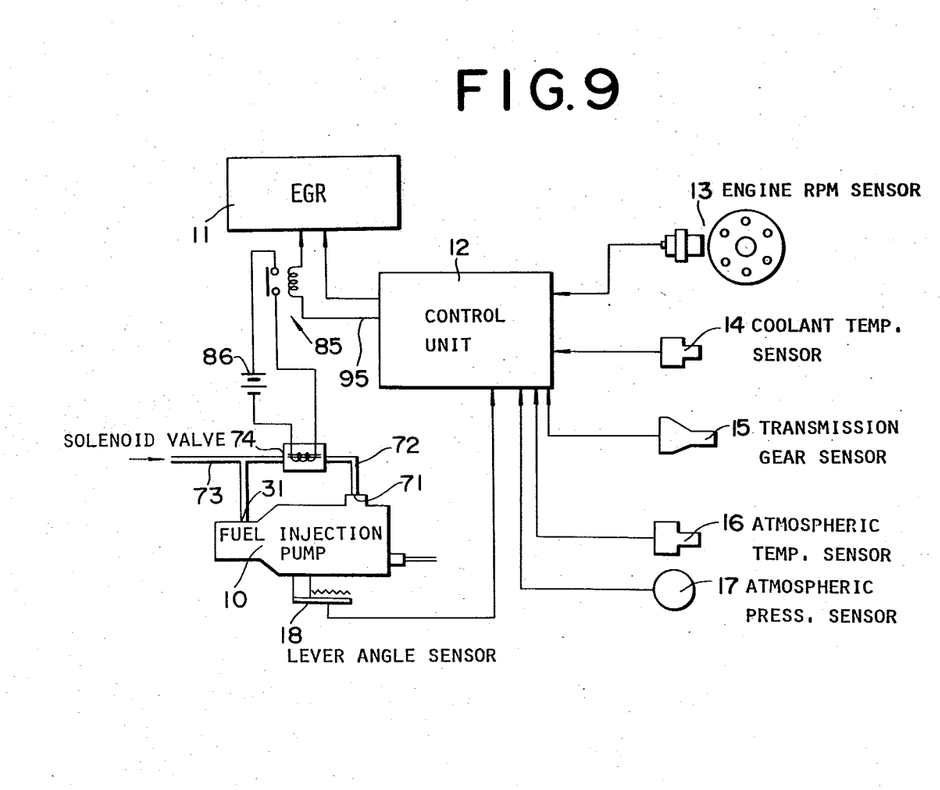
FIG. 9 is a diagrammatic view of a fuel injection timing control system according to still another embodiment of the present invention.

Still another embodiment of the present invention is shown in FIG. 9, where similar or corresponding elements are designated by the same numerals as those of the preceding embodiments. This embodiment is designed in a similar manner to the preceding embodiments, except for the following arrangement. A sensor 85 detecting whether the EGR arrangement 11 is operative or at rest consists of a relay whose control winding is disposed in the line 95. The control unit 12 feeds the driving signal to the three-way valve 24 (see FIG. 3) through the line 95. Normally open contacts of the relay, the power source 86, and the solenoid valve 74 are connected so as to form a series circuit. Thus, when the control unit 12 energizes the three-way valve 24 to effect EGR, the contacts of the relay are closed to energize the solenoid valve 74 and then the fuel injection timing is relatively advanced in a similar way to that of the preceding embodiments.

It should be understood that further modifications and variations may be made in the present invention without departing from the spirit and scope of the present invention as set forth in the appended claims.

What is claimed is:

1. A fuel injection timing control system for a diesel engine, comprising:
    (a) a fuel injection pump for supplying fuel to the engine, timed periodically according to the rotation of the engine crankshaft;
    (b) a device connected to the fuel injection pump for varying the fuel injection timing in terms of crank angle;
    (c) an EGR means for selectively recirculating exhaust gas through the engine; and
    (d) a control unit connected to the fuel injection timing varying device and the EGR means and operable to advance the timing of the fuel injection with regard to a crank angle when the EGR means is operating to effect recirculation of exhaust gas through the engine as compared to when said recirculation is suspended.

2. A fuel injection timing control system as defined in claim 1:
    the fuel injection pump comprising;
    (a) a driving shaft coupled to the engine crankshaft so as to rotate synchronously with twice the rotation of the engine crankshaft,
    (b) a cam disc with a cam face connected to the driving shaft so as to rotate together with the driving shaft but be movable in the axial direction,
    (c) a roller engaging the cam disc so as to reciprocate the same axially, synchronously with twice the rotation of the engine crankshaft, while the cam disc rotates, and
    (d) a plunger fixed to the cam disc so as to move together with the cam disc, the plunger forcing fuel to be injected into the engine when the cam face of the cam disc passes over the roller so as to move the plunger axially, the fuel injection timing varying device comprising;
(a) a roller casing rotatably carrying the roller, the roller casing being supported so as to be rotatable relative to the cam disc, and
(b) a driving pin for rotating the roller casing relative to the cam disc, whereby the timing of fuel injected to the engine is changed as the roller casing is rotated relative to the cam disc by operating the driving pin, the control unit being operative to control the driving pin whereby when the EGR means is operating to recycle exhaust gases, the fuel injection timing is advanced relative to the timing when EGR is suspended.

3. A fuel injection timing control system as defined in claim 2:
the fuel injection timing varying device further comprising:
(a) a cylinder;
(b) a piston disposed slideably in the cylinder in such a manner as to form high-pressure and low-pressure chambers in the cylinder at its opposite ends, whereby the piston moves according to the pressure difference between the high-pressure and the low-pressure chambers, the piston being connected to the roller casing by means of the driving pin so that the roller casing is rotated according to the movement of the piston,
(c) a feed pump pressurizing and supplying fuel to the high-pressure chamber,
(d) a passage connecting the low-pressure chamber to the inlet of the feed pump,
(e) an overflow conduit connecting the outlet of the feed pump to the inlet of the feed pump, and
(f) a solenoid valve disposed in the overflow conduit to open and close the same, whereby when the solenoid valve closes the overflow conduit, the pressure in the high-pressure chamber increases to move the piston and thus rotate the roller casing relative to the cam disc, and the control unit being electrically connected to the solenoid valve for driving said valve whereby when said EGR means is operating to effect exhaust gas recirculation, the fuel injection timing is advanced in terms of crank angle.

4. The fuel injection timing control system for a Diesel engine, comprising:
(a) a fuel injection pump for supplying fuel to the engine, timed periodically according to the rotation of the engine crankshaft;
(b) a device connected to the fuel injection pump for varying the fuel injection timing in terms of crank angle;
(c) an EGR means for selectively recirculating exhaust gas through the engine;
(d) a sensor for detecting the operation of the exhaust gas recirculating arrangement; and
(e) a unit for driving the fuel injection timing varying device, the unit being electrically connected to the sensor for controlling the fuel injection timing according to the operation of the EGR means and operable to advance the timing of the fuel injection with regard to a crank angle when the EGR means is operating to effect recirculation of exhaust gas through the engine as compared to when said recirculation is suspended.

5. A fuel injection timing control system as defined in claim 4:
the fuel injection pump comprising;
(a) a driving shaft coupled to the engine crankshaft to rotate synchronously with twice the rotation of the engine crankshaft,
(b) a cam disc with a cam face connected to the driving shaft so as to rotate together with the driving shaft but to be movable in the axial direction,
(c) a roller engaging the cam disc so as to reciprocate the same axially, synchronously with twice the rotation of the engine crankshaft, while the cam disc rotates, and
(d) a plunger fixed to the cam disc so as to move together with the cam disc, the plunger forcing fuel to be injected into the engine when the cam face of the cam disc passes over the roller to move the plunger axially, the fuel injection timing varying device comprising;
(a) a roller casing rotatably carrying the roller, the roller casing being supported so as to be rotatable relative to the cam disc, and
(b) a driving pin for rotating the roller casing relative to the cam disc, whereby the timing of fuel injected to the engine is changed as the roller casing is rotated relative to the cam disc by operating the driving pin, and the unit being operative to control the driving pin whereby when the EGR means is operating to effect the exhaust gas recirculation, the fuel injection timing is advanced relative to the timing when EGR is suspended.

6. A fuel injection timing control system as defined in claim 5:
the fuel injection timing varying device further comprising;
(a) a cylinder,
(b) a piston disposed slideably in the cylinder in such a manner as to form high-pressure and low-pressure chambers in the cylinder at its opposite ends, whereby the piston moves according to the pressure difference between the high-pressure and the low-pressure chambers, the piston being connected to the roller casing by means of the driving pin so that the roller casing is rotated according to the movement of the piston,
(c) a feed pump pressurizing and supplying fuel to the high-pressure chamber,
(d) a passage connecting the low-pressure chamber to the inlet of the feed pump,
(e) an overflow conduit connecting the outlet of the feed pump to the inlet of the feed pump, and
(f) a solenoid valve disposed in the overflow conduit to open and close the same, whereby when the solenoid valve close the overflow conduit, the pressure in the high-pressure chamber increases to move the piston and thus rotate the roller casing relative to the cam disc, and the unit being electrically connected to the solenoid valve for driving said valve whereby when EGR means is operating to effect the exhaust gas recirculation, the fuel injection timing is relatively advanced in terms of crank angle.

7. A fuel injection timing control system as defined in claim 4; the exhaust gas recirculating arrangement further comprising a conduit connecting intake and exhaust manifolds of the engine, and a valve disposed in the conduit to control the exhaust gas recirculation, the sensor detecting the operation of the valve.

8. A fuel injection timing control system as defined in claim 7, the valve having a valve member movably disposed in the conduit, the sensor consisting of a limit switch detecting the motion of the valve member.

* * * * *